United States Patent [19]

Oda et al.

[11] 4,264,541

[45] Apr. 28, 1981

[54] HIGH PRESSURE METAL VAPOR LAMP AND A TRANSPARENT POLYCRYSTALLINE ALUMINA TUBE THEREFOR

[75] Inventors: Isao Oda, Nagoya; Masayuki Kaneno, Tokoname, both of Japan

[73] Assignee: NGK Insulators, Ltd., Nagoya, Japan

[21] Appl. No.: 70,472

[22] Filed: Aug. 28, 1979

Related U.S. Application Data

[62] Division of Ser. No. 659,828, Feb. 20, 1976, abandoned.

[30] Foreign Application Priority Data

Mar. 18, 1975 [JP] Japan ................................ 50-31769

[51] Int. Cl.³ ............................................. B29D 11/00
[52] U.S. Cl. ........................................ 264/62; 264/65
[58] Field of Search ................................ 264/1, 62, 65

[56] References Cited

U.S. PATENT DOCUMENTS

| | | | |
|---|---|---|---|
| 3,026,177 | 3/1962 | St. Pierre et al. | 264/65 |
| 3,026,210 | 3/1962 | Coble | 264/65 |
| 3,792,142 | 2/1974 | Kobayashi et al. | 264/65 |
| 3,834,915 | 9/1974 | Cleveland et al. | 264/1 |
| 3,834,939 | 9/1974 | Beyer et al. | 264/62 |
| 3,875,277 | 4/1975 | Brotton et al. | 264/1 |

*Primary Examiner*—John Parrish
*Attorney, Agent, or Firm*—Sughrue, Rothwell, Mion, Zinn and Macpeak

[57] ABSTRACT

A high pressure metal vapor lamp and a transparent polycrystalline alumina tube therefor have been disclosed. The average crystal grain size at ends of the tube is selectively made smaller than that of the middle portion of the tube so that the mechanical strength and the thermal shock resistance of the end portions are made higher than those in the middle portion. Accordingly, the tube hardly causes cracks by a thermal shock when the both ends of the tube are sealed and when the lamp using the tube is switched on and off. Whereas middle portion of the tube has an excellent transparency so that the lamp has a high luminance efficiency.

3 Claims, 2 Drawing Figures

FIG_2
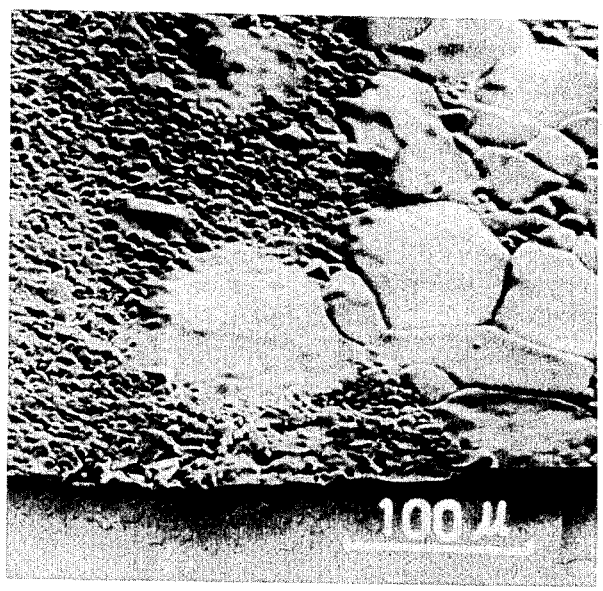

HIGH PRESSURE METAL VAPOR LAMP AND A TRANSPARENT POLYCRYSTALLINE ALUMINA TUBE THEREFOR

This is a division of application Ser. No. 659,828, filed Feb. 20, 1976, now abandoned.

BACKGROUND OF THE INVENTION

1. Field of the Invention

The present invention relates to a transparent polycrystalline alumina tube. In more detail, the present invention relates to a transparent polycrystalline alumina tube and a high pressure metal vapour lamp using the tube.

2. Description of the Prior Art

A high pressure metal vapour lamp, such as a high pressure sodium lamp has become very popular by a reason of its excellent characteristics of the high luminance efficiency. As the discharge tube of such a high pressure metal vapour lamp, generally a transparent polycrystalline alumina tube has been used.

The transparent alumina had been disclosed, for instance, in Philippe D.S. St. Pierre et al U.S. Pat. No. 3,026,177 issued Mar. 20, 1962 and entitled "Process for producing transparent polycrystalline alumina"; Robert L. Coble U.S. Pat. No. 3,026,210 issued Mar. 20, 1962 and entitled "Transparent alumina and method of preparation"; Kazuo Kobayashi et al U.S. Pat. No. 3,792,142 issued Feb. 12, 1974 and entitled "Utilizing mixtures of yttria, magnesia, and lanthanum oxide in manufacture of transparent alumina".

When the transparent polycrystalline alumina tube is used as such discharge tube of a high pressure metal vapour lamp, both ends of the tube are sealed, such as, for instance, disclosed in William C. Louden U.S. Pat. No. 3,448,319 issued June 3, 1969 entitled "Niobium end seal". The sealing is effected by firing and due to this firing process a certain number of tubes cause cracks which made the tubes unsuitable for use. A cause of such low yield of the tube is considered to be a recent tendency to make the crystal grain size of the polycrystalline alumina tube substantially larger than that disclosed in the Kobayashi et al U.S. Pat. No. 3,792,142 under an object of improving the luminance efficiency by increasing the translucency of the tube. Generally, in a translucent polycrystalline alumina, the translucency gradually increases according to an increase of crystal grain size, but the mechanical strength decreases according to an increase of crystal grain size.

The conventional high pressure metal vapour lamp using a transparent polycrystalline alumina tube having larger crystal grain size as the discharge tube has drawbacks in that it tends to cause cracks at the end portion of the tube or the portion near the electrode due to sudden temperature change of the sealed metal vapour at the time of switching on and off.

From the above explanation it may be understood that two mutually inconsistent requirements, namely an excellent translucency or good transmission property and a high mechanical strength or a high thermal shock resistance, are imposed for the transparent polycrystalline alumina tube used as the discharge tube of a high pressure metal vapour lamp.

SUMMARY OF THE INVENTION

The object of the present invention is to provide a transparent polycrystalline alumina tube which may not cause cracks at the time of sealing of both ends of the tube.

Another object of the present invention is to provide a transparent polycrystalline alumina tube having a high mechanical strength and a high thermal shock resistance at the end portions and generally having a high translucency.

Further object of the present invention is to provide a high pressure metal vapour lamp comprising a discharge tube having a high luminance efficiency on one hand and having a very high mechanical strength on the other hand which makes the tube very hard to cause cracks at the time of switching.

In one aspect the invention provides a transparent polycrystalline alumina tube in which the crystal grain size is made substantially smaller at the end portions than that of the middle portion and a high pressure metal vapour lamp using the tube as the discharge tube.

BRIEF DESCRIPTION OF THE DRAWINGS

FIG. 2 is a scanning electron microscopic photograph showing the crystal size at the boundary portion of an end portion and middle portion of the transparent polycrystalline alumina tube according to the present invention.

DESCRIPTION OF THE PREFERRED EMBODIMENTS

Figure 1:
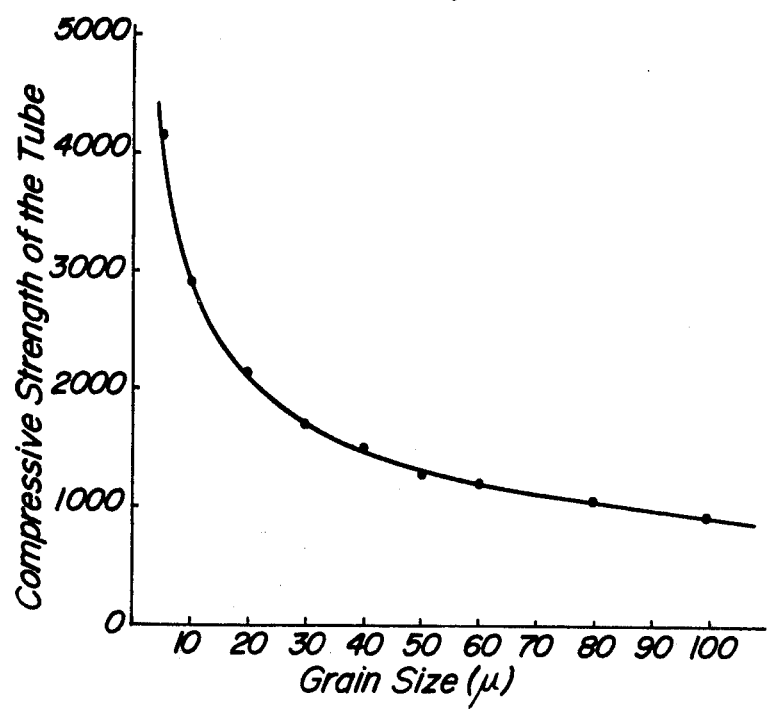
FIG. 1 is a graph showing the relation between the crystal grain size of a transparent polycrystalline alumina tube and the compressive strength of the tube.

The transparent polycrystalline alumina tube according to the present invention can be manufactured, for instance, in the following steps:
  forming a pipe by applying static water pressure for alumina powder preferably γ-alumina powder having its purity preferably more than 99.0 wt% and grain size less than 1 μm and preferably having average grain size of 0.1 μm;
  machining to obtain a desired dimension according to the need;
  impregnating nitrate solution by uniformly coating on the pipe except the end portions, in which the nitrate solution is so adjusted that the middle portion of the final product contains, 0.05 wt% of MgO, 0.05 wt% of $La_2O_3$ and 0.1 wt% of $Y_2O_3$ in $Al_2O_3$;
  drying;
  calcining in air for 2 hours at 700° C; and
  sintering in vacuo for 3 hours at 1,800° C.

The obtained transparent polycrystalline alumina tube has its average crystal grain size about 35 μm at the middle portion and about 7 μm at the end portions. As can be observed from the relation between the grain size and the compressive strength of the tube as shown in FIG. 1, the tube has the compressive strength of about 1,500 $Kg/cm^2$ at the middle portion and about 3,800 $Kg/cm^2$ at the end portions. Accordingly, the mechanical strength at both end portions is remarkably higher than that of the middle portions.

It should be noted that the compressive strength of the tube referred herein means the strength of the tube against compressive force in the circumferential direction of the tube.

Besides the above mentioned process, the tube according to the present invention can be manufactured, for instance, by forming a pipe having a composition as disclosed in the aforementioned Kobayashi et al U.S.

Pat. No. 3,792,142 and then nitrate solution of magnesium is applied on the end portions so that more MgO content is further included at the end portions. It is also possible to adjust the starting alumina material to contain different additives in the middle portion and the end portions. Further it is possible to produce the desired tube by providing temperature difference in the middle portion and the end portions at the time of sintering.

The transparent polycrystalline alumina tube according to the present invention has its general feature in that the average crystal grain size at the end portions is substantially smaller than that of the middle portion. In practice it is preferable to make the average crystal grain size at the end portions to be 1–20 μm and at the middle portion to be 10–200 μm wherein the average crystal grain size of the end portions of a tube is substantially smaller than that of the middle portions of the same tube.

The abovementioned ranges of the average crystal grain size have been derived from the fact that the gas-tightness of the tube may become imcomplete by a crystal grain size less than 1 μm due to roughness of the micro structure of the body which may have voids or bubbles at grain boundaries caused by insufficient sintering and that the translucency is affected by the so called closed bubbles of which structure contains voids or bubbles in the crystal grains by a crystal grain size over 200 μm due to exaggerated grain growth.

In a practical embodiment of the present invention it is preferred to make the average crystal grain size in the end portions to be 5 to 15 μm and that in the middle portion to be 20 to 100 μm.

EXAMPLE 1

A transparent polycrystalline alumina tube made in accordance with the present invention having total length of 115 mm and containing 0.3 wt% MgO, 0.1 wt% $La_2O_3$, and 0.1 wt% $Y_2O_3$ in the final product in the both end portions each of 15 mm length and containing each 0.1 wt% of MgO, $La_2O_3$ in the rest portion thereof or the middle portion, wherein the average crystal grain size is about 7 μm at the end portions and about 25 μm at the middle portion is compared with a conventional tube which has the additive content of each 0.1 wt% of MgO, $La_2O_3$ and $Y_2O_3$ uniformly in the tube and the overall average crystal grain size of about 25 μm. Each 100 of the two kinds of tubes are prepared and sealed through the practice mentioned in the Louden U.S. Pat. No. 3,448,319.

Table 1 shows number of tubes caused cracks at the time of sealing. Table 1 further shows a result of switching test of 500 times of on and off of high pressure sodium lamps having rating of 400 watt manufactured by using the above two kinds of tubes which did not cause cracks.

EXAMPLE 2

A number of transparent polycrystalline alumina tubes having same dimension as in the case of Example 1 having various kinds of the average crystal grain size as shown in Table 2 are prepared and various characteristics measured thereto are listed in the same table. The values of the total transmission are based on the measurement in the same manner as described by Rosa, E. B. and Taylor, A. H.: "Theory Construction and Use of the Photometric Integrating Sphere", Sci. Paper No. 447, Bull. Stand., Sept. 26, 1921. The compressive strength of the tube and the thermal shock resistivity test have been made at the end portions having width of 15 mm at both ends. The thermal shock resistivity test is a kind of cycle test to heat the 15 mm width end portion of the tube at 1,000° C. and then to cool it to the room temperature of 20° C.

EXAMPLE 3

A number of high pressure sodium lamps of 400 watt are prepared by using transparent polycrystalline alumina tubes having various crystal grain sizes as shown in Table 3 which did not cause cracks at the time of sealing. The dimension of each tube is same as that shown in Table 1. The measured total luminous fluxes in lumen and results of switching test for the lamps are shown in Table 3. In the switching test one cycle of switch on and switch off is considered as 1 time switching.

The scanning electron microscopic photograph shown in FIG. 2 is for the tube No. 1 in Table 3. The tube had been etched for 5 minutes by using hot concentrated phosphoric acid and is cut in a plane including the axis of the tube. The microscopic photograph is taken for a boundary area between the end portion and the middle portion or a portion located 15 mm from the end. The photograph is taken for lower half of the tube in the area and is seen from upper point of the inner surface of the tube. The photograph is in 300 times enlarged scale as can be seen from actual length of 100 μm. The lower side of picture illustrates the cross-section of the tube and the upper side of the picture illustrates the inner surface of the tube.

As can be observed clearly from the microscopic picture of FIG. 2, there is a substantial difference in the crystal grain size in the end portion seen on the left half of the picture and that in the middle portion seen on the right half of the picture.

TABLE 1

| No. | Average crystal grain size (micron) middle portion | Average crystal grain size (micron) end portions | Number of tubes caused cracks at the time of sealing (out of 100 tubes) | Result of switching test of the lamps |
| --- | --- | --- | --- | --- |
| 1 | 25 | 7 | 3/100 | No trouble after 500 tests |
| *2 | 25 | 25 | 31/100 | **crack at 167 and leak at 169 being unserviceable |

Remark:
No. 1 corresponds to the tube according to the present invention.
*No. 2 corresponds to the conventional tube.
**The figure indicates the number of tests when one lamp caused trouble initially.

TABLE 2

| No. | Average crystal grain size (micron) middle portion | Average crystal grain size (micron) end portions | Total transmission (%) | Compressive strength of the tube (Kg/cm²) | Thermal shock resistivity test (number of tests before causing crack) | Rate of crack at the time of sealing (%) |
| --- | --- | --- | --- | --- | --- | --- |
| 1 | 34 | 7 | 92 | 3,790 | No trouble after 500 | 2 |
| 2 | 34 | 12 | 92 | 3,050 | No trouble after 500 | 2 |
| 3 | 34 | 20 | 93 | 1,990 | No trouble after 500 | 6 |
| 4 | 30 | 20 | 93 | 1,980 | 467 | 6 |

TABLE 2-continued

| No. | Average crystal grain size (micron) middle portion | Average crystal grain size (micron) end portions | Total transmission (%) | Compressive strength of the tube (Kg/cm$^2$) | Thermal shock resistivity test (number of tests before causing crack) | Rate of crack at the time of sealing (%) |
| --- | --- | --- | --- | --- | --- | --- |
| *5 | 34 | 34 | 94 | 1,580 | 158 | 34 |

Remark:
Nos. 1-4 correspond to the tube of the present invention.
*No. 5 corresponds to the conventional tube.

TABLE 3

| No. | Average crystal grain size (micron) middle portion | Average crystal grain size (micron) end portions | Characteristics of the high pressure sodium lamp Total luminous flux (lumin) | Characteristics of the high pressure sodium lamp Switching test (No. of tests before causing cracks) |
| --- | --- | --- | --- | --- |
| 1 | 110 | 10 | 52,700 | No trouble after 500 |
| 2 | 77 | 7 | 51,900 | " |
| 3 | 49 | 10 | 50,500 | " |
| 4 | 35 | 8 | 50,300 | " |
| 5 | 27 | 5 | 49,800 | " |
| *6 | 80 | 80 | 51,300 | 149 |
| *7 | 15 | 15 | 45,200 | No trouble after 500 |

Remark:
Nos. 1-5 are Lamps using the tube made according to the present invention.
*Nos. 6 and 7 correspond to conventional Lamps.

What is claimed is:

1. A method for producing a monolithic transparent polycrystalline alumina tube wherein the average crystal grain size in the end portions of the tube is substantially smaller than the average crystal grain size of the middle portion of the tube, which comprises
    (a) forming a tube of alumina powder;
    (b) selectively impregnating the formed tube with a nitrate solution whereby on sintering the grain growth at the end portions of said tube is inhibited to a greater extent than at the middle portion of said tube the;
    (c) drying the impregnated tube; and
    (d) sintering the dried tube.

2. The method of claim 1, wherein after sintering the average crystal grain size is 1-20 microns in the end portions of said tube and 10-200 microns in the middle portion of said tube.

3. The method of claim 2, wherein after sintering the average crystal grain size is 5-15 microns in the end portions of said tube and 20-120 microns in the middle portion of said tube.

* * * * *